US012590594B2

(12) United States Patent
Holtgraver

(10) Patent No.: US 12,590,594 B2
(45) Date of Patent: Mar. 31, 2026

(54) PIPELINE ACTUATION SYSTEM

(71) Applicant: QTRCO, Inc., Tomball, TX (US)

(72) Inventor: Edward G. Holtgraver, Tomball, TX (US)

( * ) Notice: Subject to any disclaimer, the term of this patent is extended or adjusted under 35 U.S.C. 154(b) by 136 days.

(21) Appl. No.: 18/772,433

(22) Filed: Jul. 15, 2024

(65) Prior Publication Data

US 2025/0020234 A1 Jan. 16, 2025

Related U.S. Application Data

(60) Provisional application No. 63/513,851, filed on Jul. 14, 2023, provisional application No. 63/513,850, filed on Jul. 14, 2023.

(51) Int. Cl.
*F15B 13/042* (2006.01)
*F15B 1/26* (2006.01)

(52) U.S. Cl.
CPC ............ *F15B 13/042* (2013.01); *F15B 1/265* (2013.01); *F15B 13/0422* (2013.01)

(58) Field of Classification Search
CPC ..... F15B 1/265; F15B 13/042; F15B 13/0422
USPC .......................................................... 137/595
See application file for complete search history.

(56) References Cited

U.S. PATENT DOCUMENTS

| | | | | |
|---|---|---|---|---|
| 200,388 A * | 2/1878 | Glenn | D01D 5/253 | 137/625.24 |
| 910,013 A * | 1/1909 | Noesen | F16K 5/0605 | 137/625.22 |
| 2,394,487 A * | 2/1946 | Rotter | F16K 11/0655 | 137/625.68 |
| 3,480,029 A * | 11/1969 | Saxon | F16K 31/363 | 137/79 |
| 3,680,594 A * | 8/1972 | Petersen | F15B 21/12 | 137/625.69 |
| 5,437,304 A * | 8/1995 | Delcroix | B29C 35/007 | 137/625.18 |
| 6,516,706 B2 * | 2/2003 | Porter | F16D 41/10 | 91/445 |
| 6,986,499 B2 * | 1/2006 | Davis | F16K 31/363 | 251/315.01 |
| 2008/0149186 A1 * | 6/2008 | Martin | G05D 7/0647 | 137/85 |
| 2010/0217443 A1 * | 8/2010 | Hagler | F16K 5/0647 | 700/282 |

* cited by examiner

*Primary Examiner* — Umashankar Venkatesan
(74) *Attorney, Agent, or Firm* — Werner IP Law, P.C.

(57) ABSTRACT

A system using pipeline fluid pressure to provide fluid pressure to an actuator which controls the opening and closing of a pipeline valve, without exhausting pipeline media to the atmosphere.

16 Claims, 1 Drawing Sheet

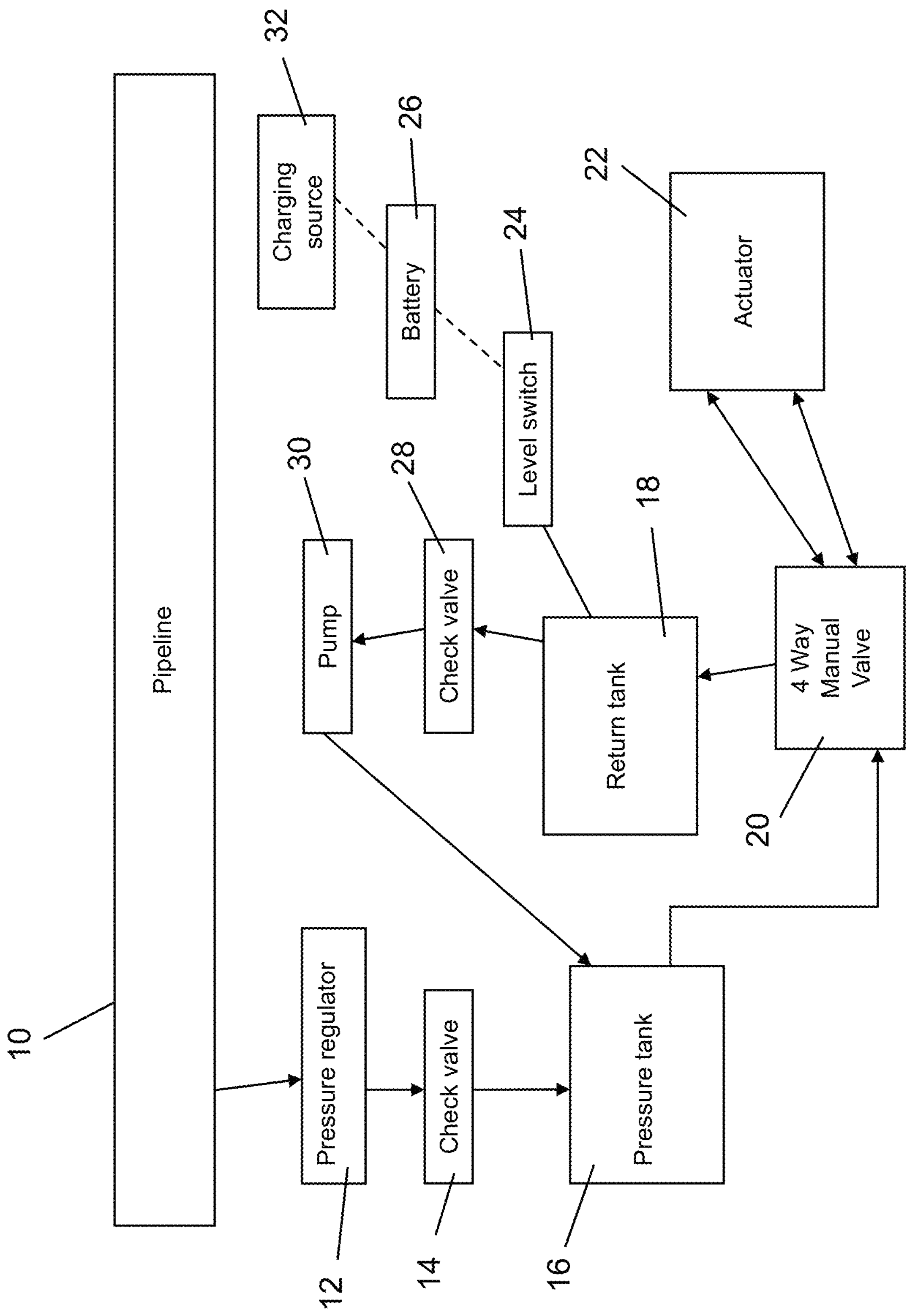
10
Pipeline
12
Pressure regulator
14
Check valve
16
Pressure tank
18
Return tank
20
4 Way Manual Valve
22
Actuator
24
Level switch
26
Battery
28
Check valve
30
Pump
32
Charging source

PIPELINE ACTUATION SYSTEM

CROSS REFERENCE TO RELATED APPLICATION

This application claims priority to U.S. Application No. 63/513,850 filed on Jul. 14, 2023, and to U.S. Application 63/513,851 filed on Jul. 14, 2023, the disclosures of which are incorporated herein by reference for all purposes.

FIELD OF THE INVENTION

The present invention relates to a system that controls the action of actuators and their driven pipeline valves when minimal or no electrical power or compressed air is available to power the actuator.

BACKGROUND OF THE INVENTION

For several years, manufacturers have provided what are generally referred to as "gas over oil" actuating systems with two separate hydraulic fluid containing chambers into which pipeline gas is supplied to pressurize the hydraulic fluid via a solenoid (or manual) valve that directs the gas to one or the other of the chambers to pressurize that chamber while exhausting from the other. Piping the hydraulic fluid to the chambers of an actuator then causes the actuator to open or close a connected pipeline valve. This system is flawed in that it releases natural gas into the atmosphere.

To prevent the release of natural gas into the atmosphere, prior art systems employ electric actuators to open and close the pipeline valves, but too often there is inadequate electrical power available, and larger arrays of solar panels are deemed inappropriate due to space requirements, theft, and vandalism. Similarly, electro-hydraulic actuators are employed, but suffer the same lack of electrical power capacity. A lack of electrical power also limits the use of compressed air based systems.

Ideally, a suitable system to power pipeline valve actuators would prevent natural gas exhaust, would use minimal electrical power from a storage device (e.g., a battery) that would provide sufficient power to drive the actuator, and would be recharged by a limited capacity electrical systems (small solar panel, etc.).

SUMMARY OF THE INVENTION

In one aspect, the present invention relates to a system which utilizes pipeline media to pressurize a single chamber filled partially with hydraulic fluid. The hydraulic fluid passes through a four-way manual valve to pressurize an actuator which in turn opens/closes a pipeline valve.

BRIEF DESCRIPTION OF THE DRAWINGS

FIG. 1 is a schematic depiction of one embodiment of the system of the present invention.

DETAILED DESCRIPTION OF PREFERRED EMBODIMENTS

Embodiments of the invention are described more fully hereafter with reference to the accompanying drawings. Elements that are identified using the same or similar reference characters refer to the same or similar elements which perform the same functions across various embodiments. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Turning to FIG. 1 there is shown one embodiment of the system of the present invention. Pipeline 10 transports media (e.g., gas). At least one valve (not shown) is disposed within pipeline 10, the opening and closing of the valve controls the flow of media through the pipeline. It will be appreciated that the valve may be a gate valve, a butterfly valve, or other type of valve well known to those skilled in the art.

The pipeline 10 may have pressures near to or greater than 1,000 PSIG. The pipeline media may thus be used as the pressure source to operate valve actuator 22. Actuator 22 may be suited to accept the pipeline pressures or may be designed for lower pressures near or greater than 80 PSIG. In the first case, the pipeline media and pressure will flow directly to pressure tank 16. In the second case, a pressure regulator 12 is disposed before pressure tank 16 to reduce the typical media pressure to 80 PSIG (or other suitable pressure range). The only difference in the two scenarios is the lack of, or use of, a pressure regulator 12, as the case may be.

In operation, pipeline media flows into the pressure tank 16 through a check valve 14 that prevents reverse flow back through the pressure regulator 12 and back to pipeline 10. When pressure regulator 12 is in use, it is important to position check valve 14 between pressure regulator 12 and pressure tank 16 so that pressure regulator 12 does not exhaust its volume. The actuator 22 is pre-filled with hydraulic fluid (e.g., hydraulic oil). The pressure tank 16 and return tank 18 are both large enough to contain a volume of hydraulic fluid sufficient to meet the desired number of cycles of actuator 22. Initially, the pressure tank 16 will hold sufficient hydraulic fluid to achieve the desired number of cycles of actuator 22 while the return tank 18 will contain a minimal volume of hydraulic fluid.

When the four way valve 20 is operated, hydraulic fluid from the pressure tank 16 is sent to actuator 22. This triggers motion of actuator 22 and in turn, the attached pipeline valve (not shown). At the same time that actuator 22 is driving the pipeline valve, hydraulic fluid is being pushed out of the opposite end of actuator 22, back through manual valve 20, and into return tank 18. With each actuator 22 cycle, more hydraulic fluid is exhausted into return tank 18. When the hydraulic fluid level in tank 18 reaches a certain point, level switch 24 is activated, in turn activating pump 30 to pump the hydraulic fluid from return tank 18 back into pressure tank 16. A second check valve 28 prevents backward flow of the hydraulic fluid to return tank 18. As depicted in FIG. 1, actuator 22 is a double acting actuator. The four way valve 20 is able to direct the flow of hydraulic fluid to either end of the actuator to drive the actuation mechanisms in opposite directions, thus opening or closing the valve, as needed. Thus, for example, in a first actuation cycle, the hydraulic fluid will be sent to the lower end of actuator 22 and exhausted from the upper end of actuator 22. Note the "lower" and "upper" ends are based on the directions as depicted in FIG. 1 for purposes of this discussion. The exact orientation may vary upon installation of the system and the invention is not to be limited based on the directional descriptions herein. In the second actuation cycle, the hydraulic fluid will be sent to the upper end of actuator 22 and exhausted from the lower end of actuator 22. The system may also be employed with a single acting actuator, in which case the fluid would only be directed to a one end of the actuator and exhausted from that same end.

At all times, the pipeline media pressure is maintained either directly (via pressure from the pipeline) or via the optional pressure regulator 12. Sufficient hydraulic fluid is initially stored in pressure tank 16 to enable the desired number of cycles assuming zero return of hydraulic fluid via pump 30. In other words, there is sufficient hydraulic fluid in pressure tank 16 that cycles can run until high level switch 24 is activated in return tank 18. The return flow from pump 30 will in fact extend the number of available cycles depending upon the flow rate of pump 30. Regardless of the amount of hydraulic fluid flowing out of pressure tank 16, the pressure from the pipeline media maintains the pressure in the pressure tank 16. Thus the system can continue to operate as long as hydraulic fluid is in pressure tank 16. In fact, should the hydraulic fluid be consumed from pressure tank 16, the system can continue to operate with the pipeline media itself pressurizing the actuator 22. However, this would result in the undesirable exhausting of pipeline media to the atmosphere with each subsequent actuator 22 cycle, but would still ensure the pipeline valve could be closed. The direct pipeline media actuation serves as an emergency backup to ensure closing of the valve when there is insufficient hydraulic fluid.

As electrical power is consumed by pump 30, battery 26 will discharge accordingly. The run time of pump 30 will determine the rate of discharge by battery 26. Charging source 32 will recharge battery 26 as needed, but at a far lesser rate than would be required for an all-electric or electro-hydraulic actuation system. Thus, the size of any charging source 32 could be smaller, less obvious, and less subject to theft and vandalism.

The system of the present invention provides multiple advantages over the prior art systems. The system operates without exhausting pipeline media (e.g., natural gas) to the atmosphere. The system can work with valves of varying types and with double- or single-acting actuators. The amount of electricity required to power the system is significantly lower than prior art electric systems.

It will be appreciated that the system of the present invention may include additional conduits, control mechanisms, and the like which are necessary for the operation thereof but which are well known to those skilled in the art and thus are not described herein.

Although specific embodiments of the invention have been described herein in some detail, this has been done solely for the purposes of explaining the various aspects of the invention and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

The invention claimed is:

1. A system for pressurizing an actuator which is operable to open and close a pipeline valve disposed within a pipeline carrying pressurized media, the system comprising:

a pressure tank in open communication with said pipeline, said pressure tank containing hydraulic fluid;

a four-way valve in open communication with said pressure tank and in open communication with said actuator;

a return tank in open communication with said four-way valve;

a pump operatively connected to said return tank;

whereby pressurized media from said pipeline enters said pressure tank and drives hydraulic fluid from said pressure tank through said four-way valve and into said actuator to actuate the opening or closing of said pipeline valve; and whereby hydraulic fluid is exhausted from said actuator, through said four-way valve and into said return tank, and whereby said pump operates to pump hydraulic fluid from said return tank to said pressure tank.

2. The system of claim 1, further comprising a check valve disposed between said pipeline and said pressure tank.

3. The system of claim 1, further comprising a pressure regulator disposed between said pipeline and said pressure tank.

4. The system of claim 1, further comprising a level switch operably connected to said return tank and to said pump, whereby when hydraulic fluid in said return tank reaches said level switch, said level switch initiates the operation of said pump.

5. The system of claim 1, further comprising a check valve disposed between said return tank and said pump.

6. The system of claim 1, further comprising a battery connected to said pump and operative to power said pump.

7. The system of claim 6, further comprising a charging source connected to and operative to recharge said battery.

8. The system of claim 1, wherein hydraulic fluid enters said actuator at a first location and is exhausted from said actuator at a second location.

9. A method for pressurizing an actuator which is operable to open and close a pipeline valve disposed within a pipeline carrying pressurized media, the method comprising:

providing a pressure tank in open communication with said pipeline, said pressure tank containing hydraulic fluid;

providing a four-way valve in open communication with said pressure tank and in open communication with said actuator;

providing a return tank in open communication with said four-way valve;

providing a pump operatively connected to said return tank;

introducing pressurized media from said pipeline into said pressure tank such that it drives hydraulic fluid from said pressure tank through said four-way valve and into said actuator to actuate the opening or closing of said pipeline valve; and exhausting hydraulic fluid from said actuator, through said four-way valve and into said return tank, and using said pump to pump hydraulic fluid from said return tank to said pressure tank.

10. The method of claim 9, further comprising a providing check valve between said pipeline and said pressure tank.

11. The method of claim 9, further comprising providing a pressure regulator between said pipeline and said pressure tank.

12. The method of claim 9, further comprising providing a level switch operably connected to said return tank and to said pump, whereby when hydraulic fluid in said return tank reaches said level switch, said level switch initiates the operation of said pump.

13. The method of claim 9, further comprising providing a check valve between said return tank and said pump.

14. The method of claim 9, further comprising providing a battery connected to said pump and operative to power said pump.

15. The method of claim 14, further comprising providing a charging source connected to and operative to recharge said battery.

16. The method of claim 9, wherein hydraulic fluid enters said actuator at a first location and is exhausted from said actuator at a second location.

* * * * *